United States Patent [19]

Acampora

[11] 4,087,787
[45] May 2, 1978

[54] DECODER FOR IMPLEMENTING AN APPROXIMATION OF THE VITERBI ALGORITHM USING ANALOG PROCESSING TECHNIQUES

[75] Inventor: Anthony Acampora, Freehold, N.J.

[73] Assignee: Bell Telephone Laboratories, Incorporated, Murray Hill, N.J.

[21] Appl. No.: 788,887

[22] Filed: Apr. 19, 1977

[51] Int. Cl.² .......................................... G06F 11/12
[52] U.S. Cl. ....................................... 340/146.1 AQ
[58] Field of Search ............ 340/146.1 AQ, 146.1 AV

[56] References Cited

U.S. PATENT DOCUMENTS

| 3,789,360 | 1/1974 | Clark, Jr. et al. | 340/146.1 AQ |
| 3,815,028 | 6/1974 | Rabow | 340/146.1 AQ |
| 4,015,238 | 3/1977 | Davis | 340/146.1 AQ |

OTHER PUBLICATIONS

Rudolph, Generalized Threshold Decoding of Convolutional Codes, IEEE Transactions on Info. Theory, vol. IT-16, No. 6, Nov. 1970, pp. 739-745.

Primary Examiner—Charles E. Atkinson
Attorney, Agent, or Firm—Erwin W. Pfeifle

[57] ABSTRACT

The present invention relates to two novel approaches for implementing an approximation of the Viterbi decoding algorithm using analog processing techniques which offer the potential for decoding at higher rates than currently achievable with digital processing decoders. The first approach employs at least one tapped delay means having a plurality of taps to enable the provision of the inverted and noninverted received analog channel waveform while path metric operations are performed by selectively switching between corresponding inverting and noninverting provisions of the at least one delay means according to the contents of a decision-directed digital memory. The second approach employs sample-and-hold circuits to store and update the path metrics based upon previous maximum-likelihood decisions.

17 Claims, 9 Drawing Figures

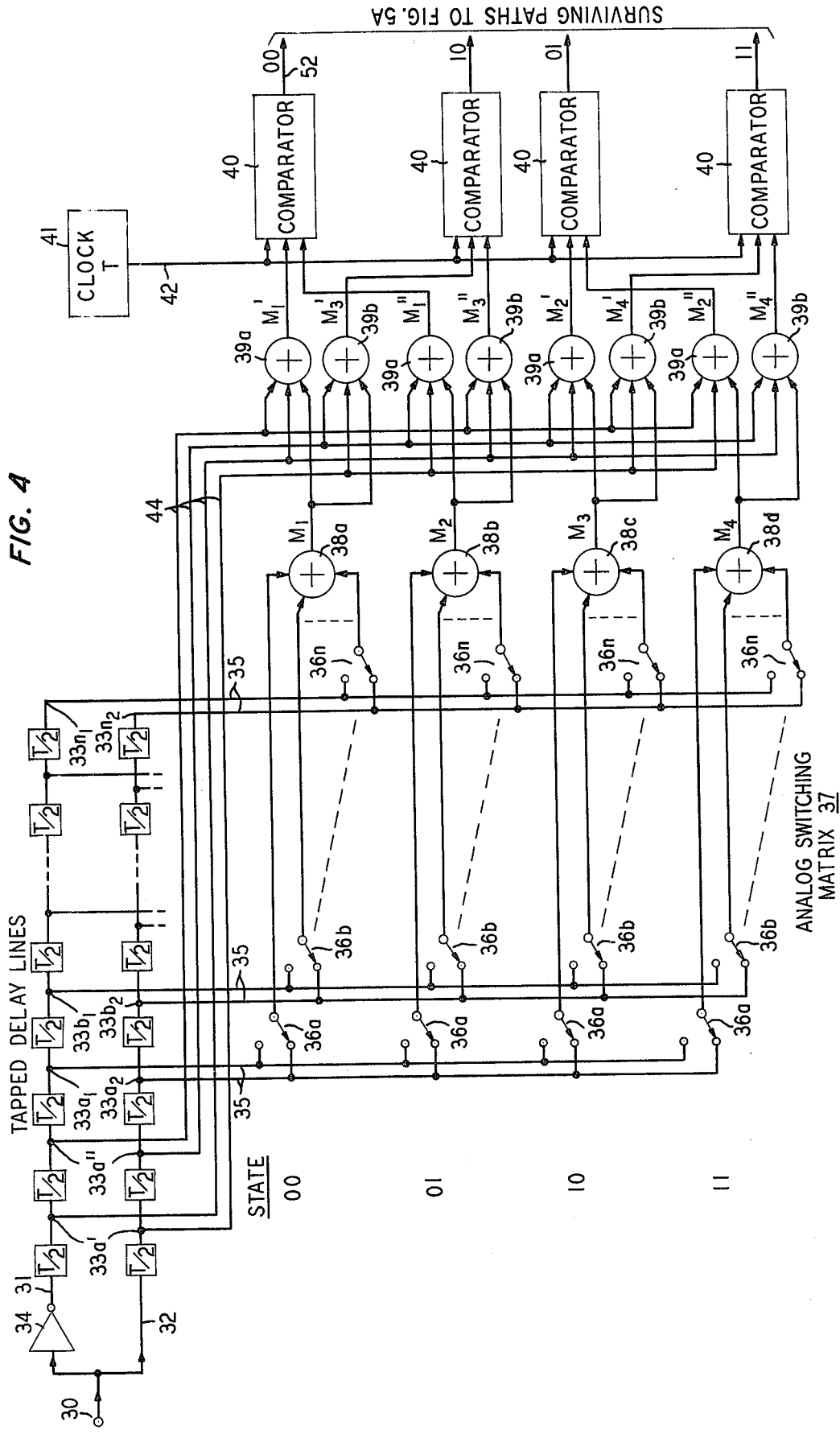

DECODER FOR IMPLEMENTING AN APPROXIMATION OF THE VITERBI ALGORITHM USING ANALOG PROCESSING TECHNIQUES

BACKGROUND OF THE INVENTION

1. Field of the Invention

The present invention relates to decoders which implement an approximation of the Viterbi algorithm by using analog processing techniques and, more particularly, to Viterbi decoders which temporarily store the received analog channel signals and perform path metric computations using both the stored analog signals and analog voltage signals representative of the most recently computed likelihood functions.

2. Description of the Prior Art

Convolutional coding-Viterbi decoding has attracted considerable attention, for example, in space applications where prime power is limited. Radio-frequency power savings of 4 to 5 dB are readily achieved with a decoder structure of manageable complexity. Decoding is accomplished by appropriately sampling the received process, quantizing to three-bit accuracy, and performing path metric calculations via digital electronics. At present, such digital decoding is limited to data rates of about 10 megabits/sec. using Transistor-Transistor Logic (TTL) technology or perhaps 30 megabits/sec. using Emitter-Coupled Logic (ECL). Higher data rates, consistent with the allowable bandwidth of satellite systems operating in the 4/6 or 12/14 GHz bands, can only be accommodated by multiplexing together the encoded channel symbols from a number of low data rate sources. This multiplexing can be done either in time, which would require a demultiplexer followed by a number of parallel decoders at the receiver, or in frequency, which would require a subdivision of the satellite band into several narrowband channels, each with its own transponder and decoder.

A technique for decoding convolutional codes was disclosed in the article "Error Bounds for Convolutional Codes and an Asymptotically Optimum Decoding Algorithm" by A. J. Viterbi in *IEEE Transactions on Information Theory*, Vol. IT-13, No. 2, pp. 260–269, Apr. 1967 which suggests an algorithm for selecting a limited number of survivor sequences in decoding a convolutional code. The articles "Convolutional Codes and Their Performance in Communication Systems" by A. J. Viterbi in *IEEE Transactions on Communications Technology*, Vol. COM-19, No. 5, October 1971, pp. 751–772 and "Viterbi Decoding for Satellite and Space Communication" by J. A. Heller et al. in *IEEE Transactions on Communications Technology*, Vol. COM-19, No. 5, October 1971 at pp. 835–848 discuss the Viterbi decoding algorithm and the general application in a decoder.

A typical prior art decoder is disclosed in U.S. Pat. No. 3,789,360 issued to G. C. Clark, Jr. et al. on Jan. 29, 1974 which relates to a decoder for correcting and decoding convolutional data. The decoder includes correlators having logic circuits which correlate newly received branches of data with all possible incremental paths representing branch transitions between states. Accumulators compute a new running correlation for every immediately previous survivor path with every possible new branch transition appended. Comparators then compare the correlation state of all paths entering that state and select the highest correlated path as the survivor path for that state. Additional comparators compare the running correlations of the survivor sequences to identify the survivor sequences having the highest correlation. Tracing apparatus then reconstructs the survivor sequences to identify the states occupied by the sequence at earlier branch intervals in order to permit logic circuits to decode each message bit of the original message.

As described in the above-mentioned references, with the Viterbi algorithm, data is not decoded as soon as it is received. Instead, a sequence of data, having a predetermined decoding depth, following the digit to be decoded is first collected. Then, by computing what are known as path metrics, a limited number of possible messages are selected, each extending throughout the decoding depth far beyond the digit presently to be decoded, with one such survivor sequence ending in each of the data states. A correlation between each survivor sequence and the data actually received is computed for the entire decoding depth under consideration. The highest correlated of the survivor sequences is then selected to be the sole survivor sequence. The earliest received digit or digits within the decoding depth is then permanently decoded under the temporary assumption that the sole survivor sequence is the correct sequence.

SUMMARY OF THE INVENTION

The present invention relates to decoders which implement an approximation of the Viterbi algorithm by using analog processing techniques, and more particularly, to Viterbi decoders which temporarily store the received analog channel signals and perform path metric computations using both the stored analog signals and analog voltage signals representative of the most recently computed likelihood functions.

In accordance with one aspect of the present invention, decoding apparatus is disclosed for decoding convolutionally encoded data which employs at least one delay means having a plurality of taps spaced at an arbitrary predetermined code rate to enable the provision of inverted and noninverted received convolutionally encoded analog channel waveforms for each tap while path metric operations are performed by selectively switching between the inverting and noninverting waveform provisions according to the contents of a decision-directed digital memory.

In accordance with another aspect of the present invention, decoding apparatus is disclosed for decoding convolutionally encoded data which employs sample-and-hold circuits to store and update and path metrics based upon previous maximum-likelihood decisions.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 4 is a simplified block diagram of a first arrangement for implementing the decoder in accordance with the present invention;

DETAILED DESCRIPTION

In accordance with the following description, three arrangements are described for implementing the Viterbi algorithm in a natural analog manner. Such an analog decoder has the potential for significantly increasing the allowable data rate since path metric calculations are performed by analog circuitry of wide bandwidth. There is no need for high speed analog-to-digital converters, and degradation resulting from quantization error is eliminated. Although this degradation is generally small for channels characterized by sufficient bandwidth to accommodate coding redundancy, the degradation becomes more pronounced on real band-limited channels. The analog decoders to be described can be readily modified by those skilled in the art to perform such higher precision operations as (1) maximum-likelihood sequence estimation of convolutionally encoded data in the presence of intersymbol interference or (2) decoding of multilevel or polyphase codes. A modified analog structure can also be applied to perform maximum-likelihood sequence estimations in the absence of coding, thereby making it suitable for equalization of severely band-limited wideband data.

The description which follows is primarily directed towards Viterbi decoders which use analog processing techniques to decode a simple constraint length $K = 3$, rate $\frac{1}{2}$ binary convolutional code on a memoryless channel. However, it will be understood that such description is exemplary only and is for purposes of exposition and not for purposes of limitation. It will be readily appreciated that the inventive concepts described are equally applicable to decode convolutional codes having different constraint lengths and rates or nonbinary or multilevel alphabets, transmissions, etc. after the appropriate modification is made to the decoder as will be easily determined by one skilled in the art once the constraint length and rate is known.

Figure 1:
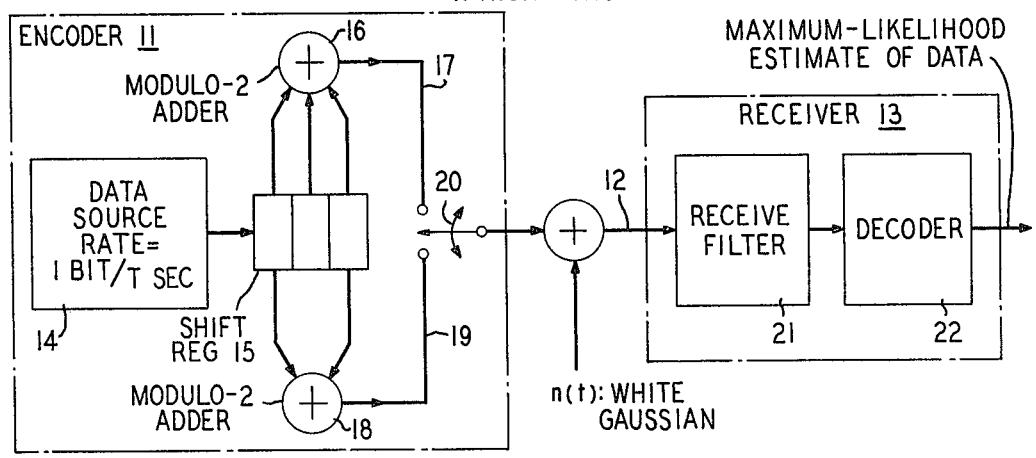
FIG. 1 is a typical communication system employing a $K = 3$, $R = \frac{1}{2}$ binary convolutional code known in the prior art.

For adequate background for the subsequent description of the present Viterbi decoders, FIG. 1 shows a typical prior art communication system employing a $K = 3$, $R = \frac{1}{2}$ binary convolutional code comprising an encoder 11, a channel 12, and a receiver 13. There, binary data from a source 14 is shifted into a three-bit shift register 15 at a rate of one bit every T seconds. A first modulo-2 adder 16 operates on the information stored in all three bits in register 15 to produce a resultant first binary bit on transmission line 17 while, simultaneously, a second modulo-2 adder 18 operates on the first and third bits in register 15 to produce a resultant second binary bit on transmission line 19. During each T second, a commutator 20 first selects the signal on first transmission line 17 and then the signal on second transmission line 19 and thereby transmits two binary digits over channel 12 for each data bit shifted into register 15. In transmission of the convolutionally encoded data, white, Gaussian noise and other interfering signals are usually introduced onto the binary signals propagating along channel 12 such that the received binary data signals are somewhat degraded.

At receiver 13, a noise and band-limiting filter 21 receives the desired signal from channel 12 and rejects interference from outside this band. The filtered signal is used as an input to decoder 22 which produces at its output a binary signal which is a good approximation to the true maximum-likelihood estimate of the original source data signal.

More particularly, decoding is accomplished by forming the log-likelihood function which hereinafter will be referred to as the path metric:

$$\Lambda(a) = \sum_k r_k y_k(a) \qquad (1)$$

where $r_k$ is the $k^{th}$ sample of the received process subsequent to receiver matched filtering, $a$ is the assumed information sequence, and $y_k(a)$ is the $k^{th}$ channel symbol for that sequence. Two samples are taken every T seconds. The path metric is formed for each possible source sequence $a$, and that sequence for which the metric is largest is selected as the best estimate to the true transmitted sequence.

As was shown in the prior art references discussed hereinbefore, metric calculations are an application of dynamic programming techniques and that maximum-likelihood decoding can be performed without actually finding the path metric for each sequence. The procedure is illustrated by the well-known state diagram of FIG. 2. The state is defined as the contents of the first two stages of shift register 15, which changes at a T-second rate. When considering State 00, at time $t_o + T$, this state can be reached from either of States 00 or 01, both transitions corresponding to a data bit 0 having entered the coder. If the partial metrics corresponding to each of the two merging paths are known up to and including time $t_o + T$, then since two paths have merged, the most likely path leaving State 00 for $t > t_o + T$ must contain, as a subset, the path with the greatest metric up to that point since future samples $r_k$ cannot affect past metrics.

Figure 2:
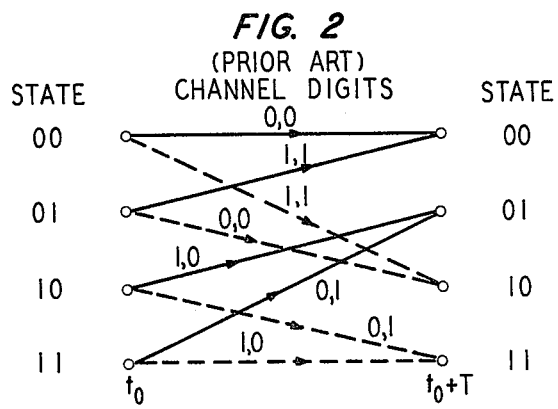
FIG. 2 is a known decoding diagram illustrating the allowable state transitions and encoded channel symbols for the convolutional code of FIG. 1.
Figure 3:
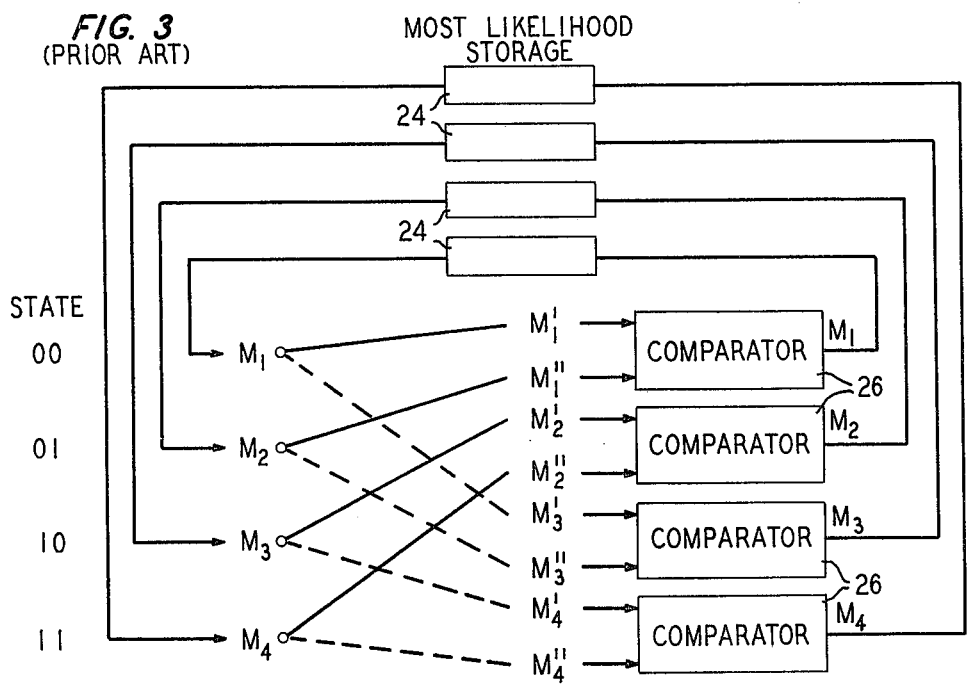
FIG. 3 is a block diagram of the typical known convolutional code decoding process.

FIG. 3 illustrates the typical arrangement for decoding convolutional codes wherein at time $t = t_o$ the four most likely paths representing the path leading into each of the four states and their associated metrics are known and stored in most likelihood storage means 24. Two channel samples are received during the time interval $[t_o, t_o + T]$ and these two samples are correlated with the assumed prior channel digits, in accordance with Equation (1), and added to the existing metrics to form eight new metrics, two for each state, in the portion of FIG. 3 corresponding to the state diagram of FIG. 2. The two metrics for each state are compared in comparators 26 and the largest of the two competing metrics is determined for each state and the path corresponding to the larger metric, along with the metric itself, is stored in most likelihood storage means 24 for future calculations.

It can be shown that with high probability, all four surviving paths at each node in time have previously emerged from a common state 4 or 5 constraint lengths into the past. Thus, the common path can be decoded as the most likely source subsequence.

Figure 5A:
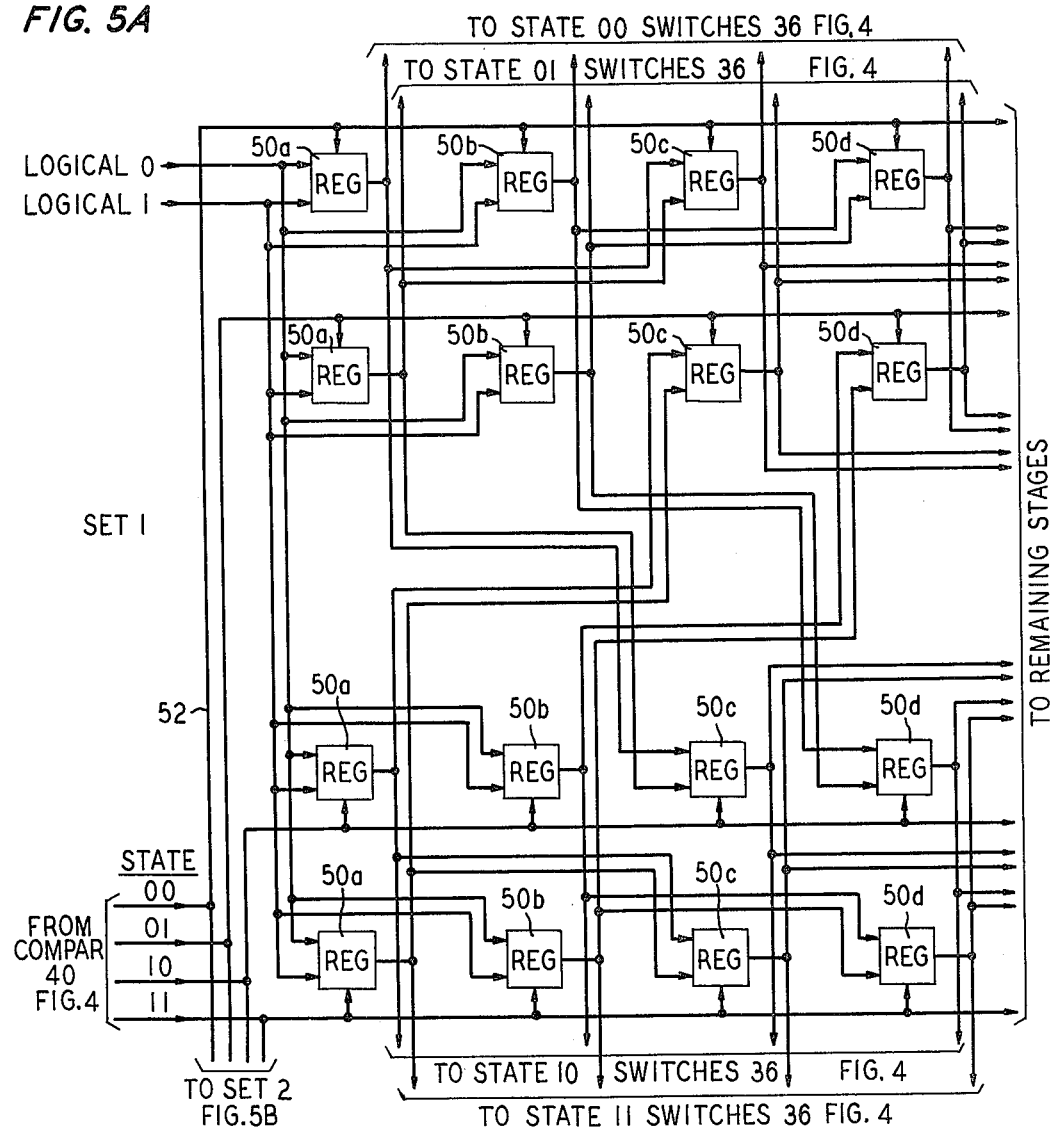
FIGS. 5A and 5B are simplified block diagrams of typical logic circuitry for storing and updating the information of the most likely channel symbol sequence and source sequence or path leading to each state, respectively.
Figure 5B:
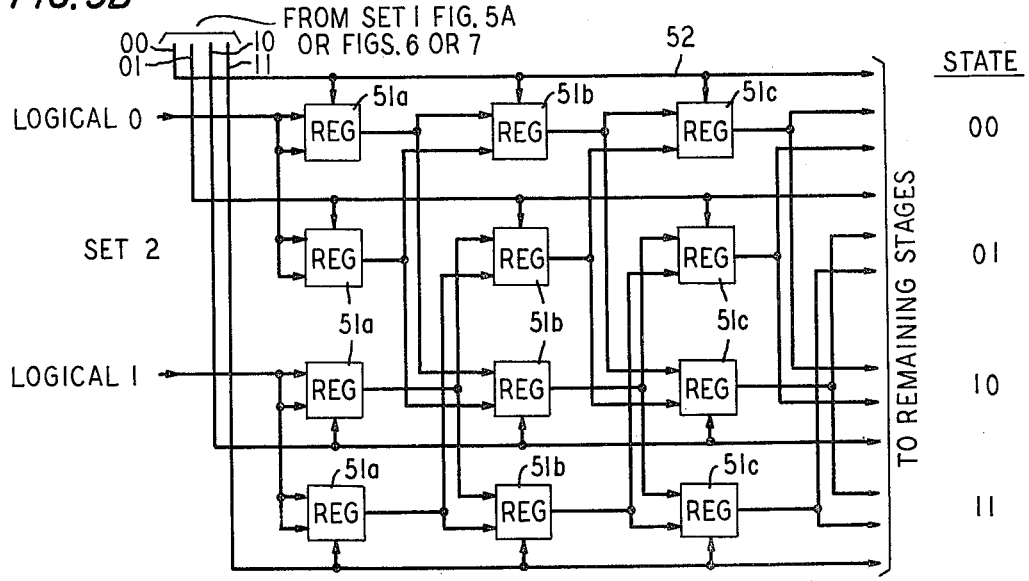

A first arrangement in accordance with the present invention for implementing the Viterbi algorithm using analog processing techniques is shown in FIGS. 4, 5A and 5B. In FIG. 4, the analog input signal to decoder 22 of FIG. 1 is received at input terminal 30, the input signal being the convolutionally encoded signal transmitted by encoder 11 and possibly distorted by white, Gaussian noise or other interfering signals while propagating in channel 12 or receiver 13. The received analog signal is simultaneously applied to a first and a second tapped delay line (TDL) 31 and 32 each delay line having taps 33 spaced therealong at the channel 12 symbol rate, i.e., T/2 seconds. The memory of each of delay lines 31 and 32 is equivalent to at least 4-5 constraint lengths of encoder 11 which is equivalent to at least 8-10 times the constraint length of the coder. An inverter 34 inverts the input signal to TDL 31 so that the contents of delay lines 31 and 32 are complements of each other.

Each of the corresponding taps 33a-33n of delay lines 31 and 32, which are associated with the signal delayed 3T/2 time intervals or more, is multipled via leads 35 to a separate corresponding pole of each of four single-pole, double-throw, analog signal switching means 36 which constitute a separate column of a switching matrix 37. Each of the analog signal switching means 36 of a column is associated with a separate one of the four states shown in FIG. 2, and can comprise any form of equivalent switching means such as, for example, an FET. As an example, tap $33a_1$ of TDL 31 and tap $33a_2$ of TDL 32, providing a sample of the inverted and noninverted input analog signal which has been delayed 3T/2 time intervals, are each multipled to the associated corresponding poles of the four analog signal switches 36a. Similarly, each of the two subsequent corresponding taps, from taps $33b_1$ and $33b_2$ to taps $33n_1$ and $33n_2$ of TDL 31 and 32, are multipled to the corresponding associated poles of the associated four analog signal switches 36b to 36n, respectively. Analog signal switches 36a-36n in each row of switching matrix 37 are provided to select the positive or negative output at each corresponding tap position. The armature of each of switches 36 in a particular row, corresponding to a separate State in FIG. 2, is connected to a separate input of an associated adder 38, each adder 38 providing a summation of all the input signals from switches 36a-36n of the associated row of switches. For example, the armatures of switches 36a-36n in the row associated with State 00 are connected to separate inputs of adder 38a. Similarly, the armatures of switches 36a-36n in the rows associated with States 01, 10 and 11 are connected to separate inputs of adders 38b, 38c and 38d, respectively.

Except for the input signal samples associated with taps 33a' and 33a'' of TDL 31 and 32, switch 36 selection agrees with the channel symbols for each of the four most likely surviving paths, one path for each State. For example, if it is assumed that the length of TDLs 31 and 32 is equal to ten times the constraint length of the coder so that each delay line has ten taps, and that if the most likely path leading to State 00 has as its ten most recent channel symbols the sequence 0011010010, with the rightmost digit corresponding to the point farthest back in time and associated with tap 33n, then the eight switches 36 leading to adder 38a would be set at + + − + − − + − where a + corresponds to a logical 1 and a − corresponds to a logical 0. Thus, surviving path metric information is contained in the delay lines 31 and 32 in conjunction with settings of switches 36a-36n. Switch control for each of the switches 36 is derived from a set of four digital delay lines (shift registers) as will be described hereinafter in association with FIG. 5A.

The output signal of each of adders 38a-38d is coupled to a separate pair of adders 39a and 39b, each adder 39 corresponding to one of the two paths leaving an old state as shown in FIG. 2. Each of adders 39a and 39b is also connected to the two most recently received channel symbols via leads 44, as provided by taps 33a'' and 33a', appropriately weighted by ±1. More particularly, in accordance with the diagram of FIG. 2, a channel digit shown having a value "0" indicates that the value of that received digit is to be subtracted from the old path metric (State shown) to arrive at the new State, whereas a value of "1" indicates that the value of that received digit is to be added to the old path metric to arrive at the new State indicated. Therefore, to traverse the path from State 00 to new State 00, the two most recent channel symbols are subtracted (0,0), by using the inverted signal from taps 33a' and 33a'', from the old path metric. Similarly, to traverse the path from old State 00 to new State 10, the two most recent channel symbols are added (1,1), by using the noninverted signals from taps 33a' and 33a'', to the old path metric. Correspondingly, in FIG. 4, adder 39a, which is connected to the output of adder 38a, is representative of the path between old State 00 and new State 00 in FIG. 2, and is shown also as having two inputs connected to the inverted signals of the taps 33a'' and 33a' to permit the subtraction of the next to most recent and the most recent channel symbols, respectively. Similarly, the remaining adders 39a and 39b are appropriately connected to the inverted or noninverted signal taps 33a' and 33a'' of TDL 31 or 32 to conform to the decoding diagram of FIG. 2. In this manner, the path metric for each State is updated per the decoding diagram of FIG. 2 by adding or subtracting the two most recent channel symbols, appropriately weighted by ±1, to the set of old path metrics. Thus, in analog fashion, the set $M'_1$, $M''_1$ through $M'_4$, $M''_4$ is obtained representative of the eight paths shown in FIG. 2.

The output of the two adders 39 representative of the two paths leading to a new State are used as inputs to a separate one of four comparators 40, one comparator for each new State. The comparators 40 are provided to select the larger of each pair of input signals; comparators 40 being strobed by a system clock 41 via a signal on lead 42 to provide the comparison at the appropriate sampling instant. Emerging from each comparator 40 is a signal designating the most likely path leading to that State.

Designation of the most likely State by comparators 40 during each T time interval initiates the chain of events illustrated in FIGS. 5A and 5B. In FIGS. 5A and 5B there are shown a first and a second set of shift registers 50 and 51, respectively, each set containing a plurality of registers arranged in four rows. Within each set, one row of registers 50 or 51 is allocated to each State of the decoding diagram shown in FIG. 2 and the lead from comparator 40 of FIG. 4 associated with that State is connected to each of the registers 50 and 51 in that row for selecting the one of two inputs to be gated into each register during each time interval T. In Set No. 1, shown in FIG. 5A, the registers 50 of each row store the channel symbols in the form of binary bits corresponding to the most likely path leading to the associated State and, in turn, the contents of these registers are used to control the position of the associated analog switches 36 of FIG. 4. In Set No. 2, shown in FIG. 5B, the registers 51 contain the data information sequence most likely for each State. The shifting of information from left to right in both Sets of registers No. 1 and 2 is according to the format of the decoding diagram of FIG. 2.

For exemplary purposes, the procedure for State 00 will be illustrated. If for example, the comparator 40 associated with State 00 in FIG. 4 indicates that the analog value of $M'_1$, the output from adder 39a associated with adder 38a, is greater than the analog value of $M''_1$, the output of adder 39a associated with adder 38b, then the output signal on line 52 will cause the contents of registers 50a to 50d, etc. in the top row of Set No. 1 in FIG. 5A to be updated simply by shifting all data two units to the right and shifting in two 0s into registers 50a and 50b. This corresponds to the channel symbols for the path between old State 00 and new State 00 in FIG. 2. The shifting of data two units to the right was accomplished by the signal on lead 52 causing the signal on the top input on the left side of each register 50 in the top row of Set No. 1 to be gated into that register. If comparator 40 associated with State 00, had indicated that $M''_1 > M'_1$, then the signal on lead 52 would have caused the bottom input on the left side of each register 50 in the top row of Set No. 1 in FIG. 5A to be gated into that register thereby causing 1s to be gated into registers 50a and 50b and the values of registers 50a and 50b associated with State 01 to be gated into register 50c and 50d of the top row, etc. The movement of information in each of Sets No. 1 and 2 in FIGS. 5A and 5B and for each of the states within each set is similar to that described hereinbefore in conjunction with the updating of State 00 in Set No. 1. It will be seen that the updating of information in Sets No. 1 and 2 conforms to that illustrated in the decoding diagram of FIG. 2.

Finally, the lengths of the tapped delay lines 31 and 32 and shift registers 50 and 51 are selected to be at least 4-5 equivalent constraint lengths, implying that, with high probability, all surviving paths have a common prefix. Thus, the final stage of any row of registers 51 from Set No. 2 may be selected as the decoded most likely information digits. Alternatively, the last stage of each row of registers 51 in Set No. 2 can be used as a separate input to a well-known majority logic gate which functions to choose the output value indicated by the majority of the final stages, and in the event of a tie to output a 0 or a 1. A second alternative would be to select the final stage of the row indicating maximum likelihood.

The analog decoder described in association with FIGS. 4, 5A and 5B is potentially capable of operation at data rates of several hundred megabits/sec. Faster operation might be possible via microwave technology. The principal factor enabling operation at data rates far in excess of those achievable via digital techniques is the analog computation of path metrics.

Figure 6:
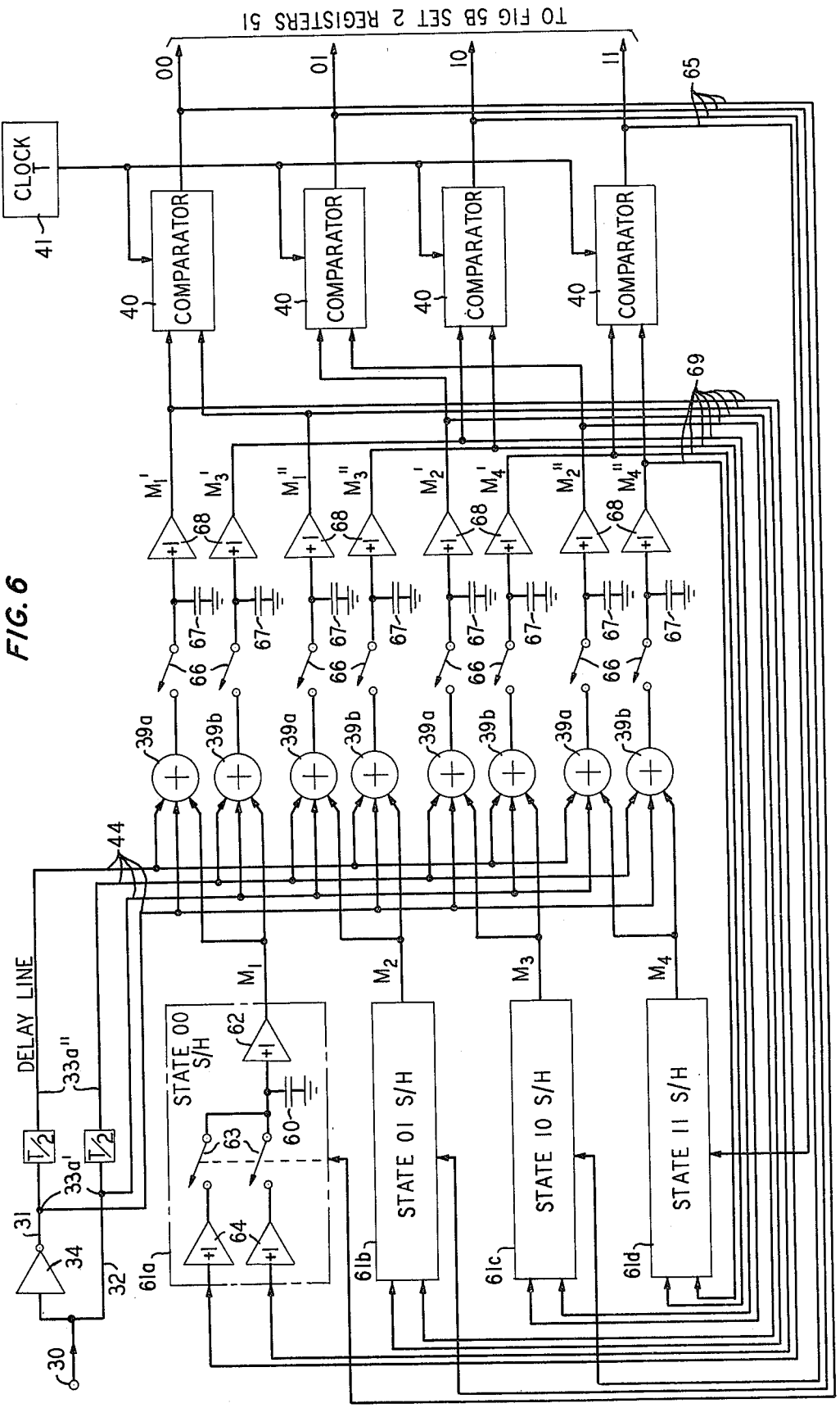
FIG. 6 is a simplified circuit diagram of a second arrangement for implementing the decoder in accordance with the present invention.

A second arrangement for implementing a decoder using analog processing techniques in accordance with the present invention is shown in FIG. 6. There, the metrics of surviving paths are stored in sample-and-hold (S/H) circuits 61 thereby eliminating the requirement for the lengthy tapped delay lines of FIG. 4. Rather, in accordance with the arrangement of FIG. 6, it is necessary to store the channel waveform over only one clock period T which encompasses two channel symbols.

In FIG. 6, the waveform received at input terminal 30 is split, as in FIG. 4, to propagate further in tapped delay lines (TDL) 31 and 32 with the signal entering TDL 31 being first inverted by inverter 34. Taps 33a' and 33a'' provide the analog samples of the two most recently received channel symbols which correspond to the noise corrupted samples of the two channel waveforms originally generated by encoder 11 during each clock period T. Prior to each clock pulse, the old path metric for each of States 00, 01, 10 and 11 is stored in sample-and-hold (S/H) circuits 61a-61d, respectively, as a charge on a capacitor 60. Each of S/H circuits 61a-61d, as shown in S/H circuit 61a, includes (a) a unity-gain, high-impedance, buffering device 62 of any suitable kind disposed between capacitor 60 and the output of the S/H circuit 61 to prevent leakage of the signal stored in capacitor 60; (b) a pair of analog signal switching devices 63 comprising any suitable device such as, for example, a pair of FETs which are connected to cause selective closing of one of the switching devices 63 during each clock period T by the signal on lead 65 generated by the associated comparator 40 to store the analog signal of the most likely path metric for that State in capacitor 60; and (c) a pair of unity-gain, low-impedance, buffering devices 64, each of devices 64 being disposed in a separate input of the pair of switching devices 63. The arrangement shown for S/H circuit 61a corresponds to the arrangement for each of S/H circuits 61b-61d. It is to be understood that such arrangement is for exemplary purposes only and not for purposes of limitation and that any suitable circuit design for S/H circuits 61a-61d which will store an analog voltage signal representative of the most likely path metric can be substituted therefor.

The steps leading to the derivation of a new metric for State 00 will now be described. In response to the channel data appearing during one clock period, the old metric for States 00 and 01 which are stored in capacitors 60 of S/H circuits 61a and 61b are updated by appropriately adding the inverted and noninverted channel waveforms, on leads 44 from taps 33a' and 33a'' and in accordance with the diagram of FIG. 2, to the old path metrics $M_1$ and $M_2$ stored in S/H circuits 61a and 61b, in adders 39a associated with States 00 and 01 to form new path metrics $M'_1$ and $M''_1$. Each of these new path metric values are transmitted via a separate analog signal switching means 66 and temporarily stored as a charge on a separate capacitor 67 which includes a unity-gain, high-impedance, buffering device 68 at the output thereof. Additionally, a buffering device (not shown), similar to buffer 64 in S/H circuits 61 can be disposed in input to each of switches 66. Elements 66-68 in each branch effectively form a separate sample-and-hold circuit which functions to temporarily store the associated new path metric value $M'_1$ and $M''_1$ and make that analog value available to the associated S/H circuit 61a over feedback paths 69 at a predesignated time. At the predesignated time, the associated comparator 40 picks the larger of the $M'_1$, $M''_1$ path metrics and generates a signal reflecting such choice over lead 65 to S/H circuit 61a to cause analog switching means 63 to be appropriately activated to store the analog signal value of the chosen metric arriving on lead 69 in capacitor 60. Similar operations are concurrently performed to derive the remaining path metrics for States 01, 10 and 11.

As with the tapped-delay line implementation of the Viterbi decoder of FIG. 4, the decisions of the comparator circuits 40 are used to update the four rows of shift registers 51 (shown in FIG. 5B) corresponding to the most likely data sequence leading to each State in Set No. 2. Again, each row of shift registers 51 is of length equal to at least 4-5 constraint lengths and, with high probability, the output from any of the four rows may be selected for the decoded output data information as described hereinbefore.

Figure 7:
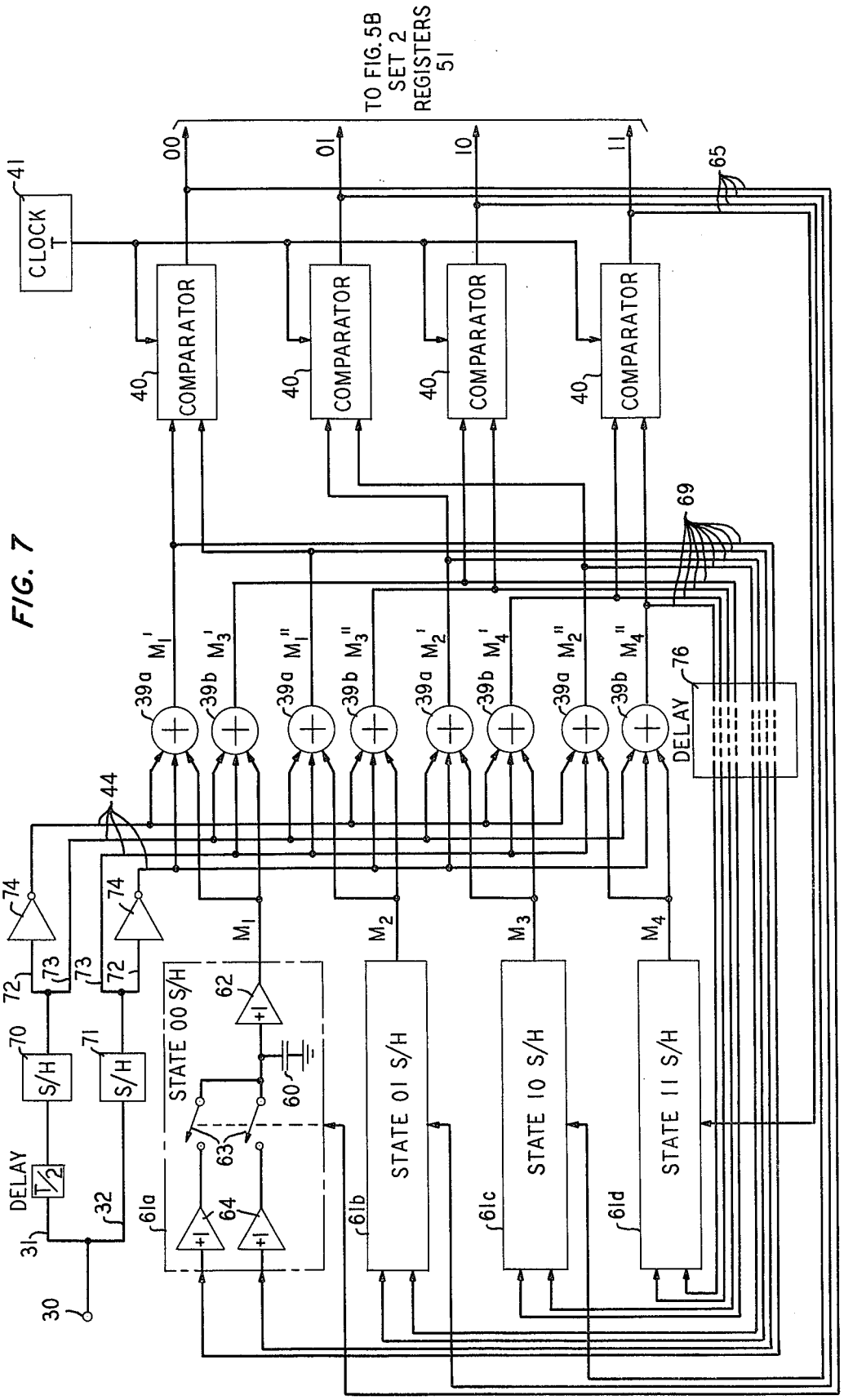
FIG. 7 is a simplified circuit diagram of a third arrangement for implementing the decoder in accordance with the present invention which is a modification of the arrangement of FIG. 6.

A third arrangement for implementing a decoder using analog processing techniques in accordance with the present invention is shown in FIG. 7. There, as in FIG. 6, the metrics of the surviving paths for States 00, 01, 10 and 11 are stored in sample-and-hold (S/H) circuits 61a-61d, respectively, thereby eliminating the lengthy tapped delay lines of FIG. 4. Rather, with the arrangement of FIG. 7, it is necessary to store the channel waveform over only one clock period T which encompasses two channel symbols.

In FIG. 7, the waveform received at input terminal 30 is split, as in FIGS. 4 and 6, into two branches 31 and 32, branch 31 including a T/2 second delay. The input signal applied to each of branches 31 and 32 is applied to sample-and-hold (S/H) circuits 70 and 71, respectively, which are updated once every clock period T to store the two most recently received analog channel symbols. The analog signal sample stored in S/H circuits 70 and 71 correspond to noise corrupted samples of the two channel waveforms originally generated by encoder 11 during each clock period. Since branch 32 does not delay the input channel waveform, S/H circuit 71 stores the most recently received waveform while S/H circuit 70 stores the next to most recently received wavefom as a result of the T/2 delay encountered by the incoming waveform. The output from each of S/H circuits 70 and 71 is split into a separate pair of branches 72 and 73 with branches 72 including an inverter 74 for providing via leads 44 the inverted and noninverted samples of the two most recently received channel waveforms. These inverted and noninverted samples on leads 44 are applied as the appropriate inputs to adders 39a and 39b for each of the four States in the manner described for adders 39a and 39b of FIGS. 4 and 6, and in accordance with the decoding diagram of FIG. 2.

FIGS. 6 and 7 are essentially the same with the exception that the analog switching means 66, capacitor 67 and unity-gain, high-impedance buffering device 68 in the output branch of each of adders 39a and 39b in FIG. 6, effectively forming a separate sample-and-hold circuit for the metric to be transferred back to S/H circuits 61a-61d, have been replaced in the arrangement of FIG. 7 by a separate delay circuit 76 in each of the feedback paths 69. Delay circuits 76 are merely provided as a precautionary measure and can comprise any suitable form sufficient to provide a delay equal in length to the acquisition time of the S/H circuits 61a-61d and are inserted into the feedback loops 69 to prevent instability during the brief period when the loops are closed via switches 63, i.e., when the S/H circuits 61a-61d are acquiring. The steps leading to the derivation of the new path metrics for States 00, 01, 10 and 11 are the same as described for the arrangement of FIG. 6 with the difference that delay circuits 76 of FIG. 7 perform the function of capacitors 67 of FIG. 6.

Figure 8:
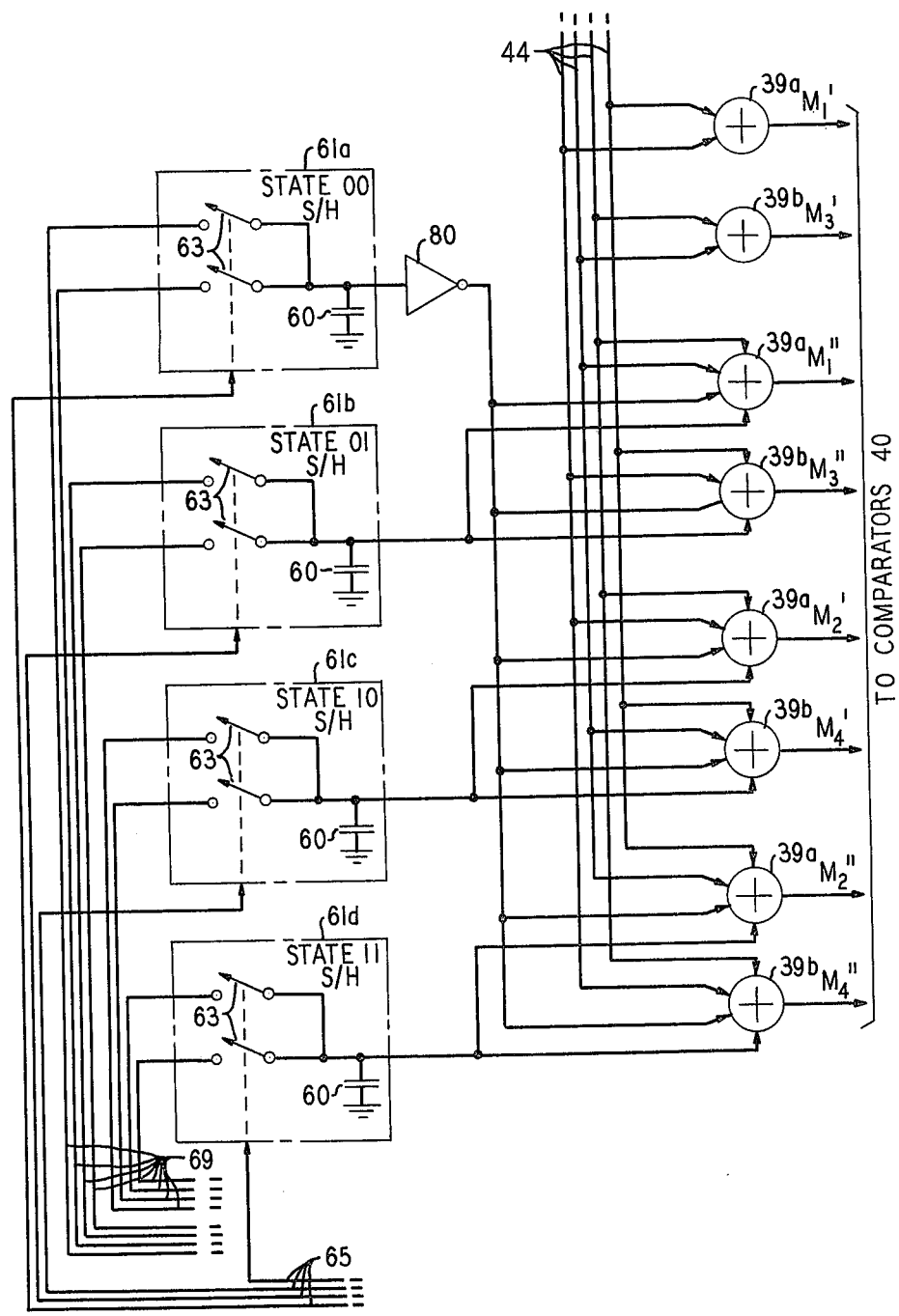
FIG. 8 is a simplified circuit diagram for preventing metric overflow in the arrangements of FIGS. 6 and 7.

With the arrangements of FIGS. 6 and 7, it is possible that the path metrics can increase without bound with time. To prevent metric overflow, which corresponds to saturation of an active device, one metric can be arbitrarily set to zero. FIG. 8 illustrates an arrangement for preventing metric overflow wherein the original value of one metric, e.g., the old path metric for State 00, is first subtracted from all other metrics, thereby preserving the integrity of the difference between path metrics. As shown in FIG. 8, such subtraction is accomplished by inverting the output from S/H circuit 61a in inverter 80 and applying the inverted signal as an input to adders 39a and 39b associated with transitions out of States 01, 10 and 11. In the normalization of the metrics according to the arrangement of FIG. 8, no lead is shown from S/H circuit 61a to adders 39a and 39b producing new metrics $M'_1$ and $M'_3$, respectively, since the addition of the inverted and noninverted inputs from S/H circuit 61a to these adders would provide an effective cancellation of these two signals. It is to be understood that the inverted output from any one of S/H circuits 61b-61d can be used instead of the one from S/H circuit 61a to effect metric normalization.

It is well within the scope of the present invention to use bipolar operational amplifiers (OP AMPS) comprising inverting and noninverting input terminals or any other suitable linear device possessing inverting and noninverting input terminals for each of the adders 38 and 39 shown in FIGS. 4, 6, 7 and 8 to avoid the necessity for separately providing both inverted and noninverted input analog signal samples as provided, for example, by inverter 34 and TDLs 31 and 32 in FIGS. 4 and 6, inverters 74 and lines 72 and 73 in FIG. 7. and inverter 80 in FIG. 8. Instead, the noninverted analog input signal sample, as provided by TDL 32 of FIGS. 4 and 6, lines 73 in FIG. 7 and a noninverted output of S/H circuit 61a in FIG. 8, can be selectively connected to a noninverting or inverting terminal of the associated bipolar operational amplifier 38 or 39 to provide the necessary noninverted and inverted input signal sample, respectively, as is well known to those skilled in the art.

For example, if adders 38 and 39 in FIG. 4 were replaced with bipolar operational amplifiers 38 and 39, then TDL 31 could be eliminated and the noninverted signals from taps 33a' and 33a'' of TDL 32 could be connected via leads 44 to the proper inverting and noninverting input terminals of OP AMPS 39a and 39b to enable the proper computation of the transition out of each of the States. For instance, the noninverted signal from taps 33a' and 33a'' of TDL 32 would be connected to separate inverting input terminals of the OP AMP 39a associated with State 00 to permit the proper computation for the value for transition $M'_1$. Additionally, when adders 38a-38d are replaced by separate OP AMPS 38a-38d, then switches 36a-36n would have to be reversed and the noninverted signal from each of taps $33a_2$-$33n_2$ of TDL 32 would be connected to the armatures of associated switches while the poles, shown connected to the inverting or noninverting signal from the associated tap, would be connected to the proper inverting or noninverting input terminals of the associated OP AMPS 38a-38d. For example, the armature of switch 36a associated with State 00 would have its armature connected to tap $33a_2$ and the upper and lower poles connected to a separate inverting and noninverting input terminal of OP AMP 38a. Similar modifications can be made for FIGS. 6 and 7. In FIG. 8 the modification can be effected by eliminating inverter 80 and coupling the noninverted output from S/H circuit 61a to the inverting input terminals of the OP AMPS 39a and 39b associated with S/H circuits 61b-61d.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A decoder for decoding a stream of received convolutionally encoded data, which may be corrupted by noise, having a predetermined plurality of possible states and an arbitrary predetermined code rate, comprising an input terminal capable of receiving the stream of convolutionally encoded data;

first means connected to said input terminal capable of both (a) effecting the availability of at least a first and a second inverted and noninverted sample of the analog waveform received at said input terminal, each of said samples being separated by a time interval which corresponds to the data rate of the received signal and said first sample corresponds to the most recently received sample, and (b) computing likelihood functions represented by analog voltage signals for all possible transitions into each state of the convolutional code which has a plurality of possible states, said first means selectively using the inverted and noninverted analog waveforms of said first and second samples and the analog voltage signal representative of the most recently computed most probable likelihood function for each of said plurality of possible states for computing said likelihood functions;

second means connected to said first means capable of temporarily storing the most recently computed analog voltage signal generated by said first means representative of the most probable likelihood function for each state for subsequent use by said first means for computing the likelihood functions for each possible transition during the next time interval;

third means connected to the output of said first means for comparing the analog voltage signals representative of the likelihood functions associated with each state and generating an output signal indicating the most probable transition into each state of said plurality of possible states; and fourth means responsive to the output of said third means for storing the most likely data sequence into each state over a predetermined length and for producing at an output terminal thereof a stream of data corresponding to the decoded data.

2. A decoder according to claim 1 wherein said first means comprises at least one analog signal delay means including taps spaced at time intervals corresponding to the arbitrary predetermined code rate; and fifth means capable of effecting the availability of the inverted and noninverted samples representative of the analog input signals at said taps for computing said likelihood functions.

3. A decoder according to claim 1 wherein said first means comprises a first and a second parallel transmission line coupled to said decoder input terminal for concurrently providing said first and second analog samples of the input waveform, respectively, said first transmission line including an analog signal storage means and said second transmission line including in sequence a means for delaying the input signal by one time interval of the arbitrary predetermined code rate and an analog signal storage means; and said decoder further comprises fifth means connected to the output of the analog signal storage means of said first and second transmission lines for effecting the availability of inverted and noninverted samples of each of the signals stored in each said storage means for computing said likelihood functions.

4. A decoder according to claim 1 wherein said first means comprises a separate adder means for each possible transition between states of the convolutional code, each adder means being capable of adding both the analog voltage signal stored in the second means for the associated state and the appropriate inverted and noninverted analog waveforms of the first and second input signal samples for computing the likelihood function for the associated transition between states.

5. A decoder according to claim 1 wherein said first means comprises at least one delay means including a plurality of at least four taps spaced at time intervals corresponding to the arbitrary predetermined code rate for concurrently providing said first and second samples and at least a third and fourth noninverted samples of the analog waveform received at said input terminal; and said second means comprises a plurality of analog signal switching devices disposed in a predetermined array, each switching device being associated with both a separate one of the plurality of possible states and a separate one of the at least third and fourth taps of said at least one delay means and comprising a first and a second fixed terminal and an armature for switching between said first and second fixed terminals to selectively make available either one of the appropriate inverted and noninverted analog signal for the associated time interval to enable computation of the most probable likelihood function for the associated state.

6. A decoder according to claim 5 wherein said second means further comprises a plurality of digital storage devices disposed in an array corresponding to the array of said plurality of analog switching devices for storing, in response to the output signals from said third means, digital representations of the channel symbols along the most likely path leading to each state for each of the at least third and fourth time intervals of the arbitrary predetermined code rate, the digital signal stored in each storage device of the array causing the corresponding analog switching device in said array of switching devices to selectively make available the preferred one of the inverted and noninverted analog signal sample for computing the most probable likelihood function for the associated state.

7. A decoder according to claim 5 wherein said second means further comprises a separate second adder means for each state of said plurality of possible states having a plurality of input terminals which are each connected to the output from a separate one of the analog signal switching devices associated with the same state, each second adder means being capable of generating an output signal representative of the most recently computed most probable likelihood function for the associated state in response to the output signals from the associated analog signal switching devices.

8. A decoder according to claim 1 wherein said second means comprises a separate sample-and-hold circuit for each state of the plurality of possible states, each sample-and-hold circuit comprising storage means capable of storing the analog voltage signal representative of the most recently computed most probable likelihood function for the associated state in response to the output signal from said third means.

9. A decoder according to claim 8 wherein said storage means of each sample-and-hold circuit comprises a capacitor and each sample-and-hold circuit further comprises an analog signal switching means which is capable of selectively causing, in response to the output signal from said third means, the analog voltage signal of the most likely transition into the associated state as computed by said first means to be passed therethrough for storage in said capacitor.

10. A decoder according to claim 8 wherein the decoder further comprises
fifth means connected between said first and second means capable of temporarily storing said likelihood functions for all possible transitions into each state as computed by said first means for a period of time which is at least equal to the time needed for said third means to generate its output signal and convey said output signal to said second means.

11. A decoder according to claim 8 wherein the decoder further comprises
fifth means connected between said first and second means capable of temporarily delaying the likelihood functions for all possible transitions into each state as computed by said first means for a period of time which is at least equal to the acquisition time of said sample-and-hold circuits.

12. A decoder according to claim 8 wherein said sample-and-hold circuits are connected to said first means in a manner to cause the analog signal voltage stored in a first one of the sample-and-hold circuits to be effectively subtracted in the computation of said all possible transitions into each of said states.

13. A decoder according to claim 1 wherein said fourth means comprises a plurality of digital storage devices arranged in a predetermined array with each storage device being associated with both a separate one of the plurality of possible states and a separate one of the integers of said predetermined length to store said most likely data sequence into each state, the storage devices of the array being interconnected such that in response to the output signals from said third means a binary value indicating the most probable data bit representing the most probable transition into each state is stored in the first register of the sequence for that state while the data bit previously stored in each storage device is concurrently shifted into no more than two digital storage devices of the next stage of the array.

14. A decoder according to claim 13 wherein the output of the last storage device in one of the most likely data sequences in the array is selectively coupled to the output terminal of said fourth means for providing said stream of data corresponding to the decoded data.

15. A decoder according to claim 13 wherein said fourth means further comprises a majority logic gate connected to the output of the last storage device in each most likely data sequence stored in the array, said majority logic gate generating an output binary value indicated by the majority of said last storage devices and in the event of a tie generating a predetermined binary value.

16. A decoder according to claim 6 wherein said plurality of storage devices are interconnected such that in response to the output signals from said third means two binary values indicating the most likely channel bits corresponding to the most probable transition into each state are stored in the first and second storage devices associated with the most likely path leading into each state while data bits previously stored in each of said storage devices is concurrently shifted into no more than two digital storage devices of the subsequent alternate stage of the array.

17. A method of decoding a stream of received convolutionally encoded data having a predetermined plurality of possible states and an arbitrary predetermined code rate which may be corrupted by noise, the method comprising the steps of:
(a) making available at least a first and a second inverted and noninverted sample of the received analog waveform, each of said samples being separated by a time interval corresponding to the data rate of the received signal and said first sample corresponds to the most recently received sample;
(b) computing likelihood functions for all possible transitions into each state of the convolutional code by selectively using the inverted and noninverted analog waveforms of said first and second samples and analog voltage signals representative of the most recently computed most probable likelihood function for each of said plurality of possible states to generate analog voltage signals representative of the computed likelihood functions;
(c) temporarily storing the most recently computed analog voltage signal generated in step (b) which is representative of the most probable likelihood function for each state for subsequent use in step (b) for computing the likelihood functions for each possible transition during the next time interval;
(d) comparing the analog voltage signals representative of the likelihood functions associated with each state as generated in step (b) for determining the most probable transition into each state of said plurality of possible states; and
(e) in response to the determination made in step (d), generating a binary bit corresponding to the decoded data for the most probable transition into each state and concurrently storing the most likely data sequence into each state over a predetermined length for producing an output stream of data corresponding to the decoded data.

* * * * *